United States Patent [19]

Bryan, Jr.

[11] 3,912,300
[45] Oct. 14, 1975

[54] ARTICULATED JOINT FOR ARTICULATED VEHICLES

[76] Inventor: John F. Bryan, Jr., 3212 Mapleleaf Circle, Dallas, Tex. 75233

[22] Filed: Aug. 12, 1974

[21] Appl. No.: 496,902

[52] U.S. Cl. ............ 280/400; 280/492; 180/79.2 B; 180/51
[51] Int. Cl.² ......................................... B60D 1/00
[58] Field of Search ....... 180/51, 52, 79.2; 280/492, 280/400; 308/189 R, 207 R

[56] References Cited
UNITED STATES PATENTS

| | | | |
|---|---|---|---|
| 2,073,617 | 3/1937 | Armington | 280/440 |
| 2,941,612 | 6/1960 | Bernotas | 180/51 |
| 3,253,671 | 5/1966 | Fielding | 180/51 |
| 3,347,577 | 10/1967 | Carlson et al. | 280/400 UX |
| 3,411,809 | 11/1968 | Kampert et al. | 280/400 |

Primary Examiner—Leo Friaglia
Assistant Examiner—R. Schrecengost
Attorney, Agent, or Firm—Richards, Harris & Medlock

[57] ABSTRACT

An articulated joint for an articulated vehicle of the type comprising forward and rearward units includes upper and lower bearing members secured to brackets rigidly mounted on the rearward unit and defining a normally vertical axis of relative pivotal movement between the units. The lower bearing member is a spherical bearing, and the upper bearing member may be either a spherical bearing or an elastomeric bearing. Hydraulic cylinders are mounted in the plane of the lower spherical bearing member and extend between the units for selectively pivoting the units about the normally vertical axis and thereby effecting steering of the vehicle. The forward unit is connected to the lower spherical bearing member by means of a rigid bracket and is connected to the upper bearing member by means of an arm. The arm extends to elastomeric bushings which receive a cylindrical member mounted on the forward unit to define an axis of pivotal movement for the arm which normally extends substantially parallel to the normally vertical axis defined by the spherical bearing members. The elastomeric bushings permit the arm to both pivot about its axis of pivotal movement and to oscillate with respect to both axes further functions to restore the arm to an orientation wherein it extends substantially perpendicular to both axes, thereby permitting the units comprising the articulated vehicle to pivot relative to each other about a longitudinal axis extending through the lower spherical bearing member.

20 Claims, 3 Drawing Figures

ARTICULATED JOINT FOR ARTICULATED VEHICLES

BACKGROUND AND SUMMARY OF THE INVENTION

This invention relates to an articulated joint for articulated vehicles, and more particularly to an articulated joint which accommodates relative pivotal movement between the forward and rearward components of an articulated vehicle not only about a vertical axis to effect steering of the vehicle, but also about a longitudinal axis.

As is well known, vehicles of the type known as articulated vehicles or articulated frame vehicles currently enjoy widespread acceptance. Such vehicles typically comprise forward and rearward units interconnected by an articulated joint. Apparatus is provided for causing relative pivotal movement between the forward and rearward units to effect steering of the vehicle. This is advantageous in that the maneuverability of an articulated vehicle is substantially greater than that of other vehicle designs. Also, it is often possible to divorce the various functions performed by the vehicle such that all of the component parts of the apparatus which relate to certain functions are mounted on one unit and all of the component parts which relate to other functions are mounted on the other unit. This is advantageous in that each unit of the vehicle can be designed solely in accordance with the particular requirements.

Heretofore, articulated vehicles have been of two general types. In the first type, the articulated joint of the vehicle permits relative pivotal movement between the units of the vehicle about a vertical axis only. For example, the adjacent ends of the two units of the vehicle may be provided with brackets which receive pivot pins. Oscillation capability may be provided by mounting either of the axles of the vehicle on a subframe or cradle which is allowed to pivot about the longitudinal center line of the vehicle. This accommodates irregularities in the surface that is traversed by the vehicle.

There are inherent disadvantages to this approach, especially in four-wheel drive vehicles. Thus, it is necessary that the pivotal axis of the axle as provided by the subframe or cradle be as nearly coaxial with the drive line as possible in order to reduce drive line angularity. It has been found that exact coincidence between the axis of pivotal movement of the axle and the drive line axis is possible only at relatively great expense. Moreover, the pivotal axis of the axle is relatively inaccessible and is not readily visible, and is therefore frequently ignored from the standpoint of maintenance. This is true even though this axis is subject to substantial wear due to dirt and other contamination.

The other type of articulated vehicle employs an articulated joint which accommodates relative pivotal movement between the two units of the vehicle both with respect to a vertical axis and with respect to a longitudinal axis. This is highly advantageous, particularly with respect to articulated vehicles intended for off-the-road use. However, the articulated joints heretofore available for use in vehicles of this type have been highly complicated in design, and have heretofore been expensive to manufacture. Also, prior articulated joints capable of accommodating relative pivotal movement between the two portions of an articulated vehicle both with respect to a vertical axis and with respect to a longitudinal axis have often comprised complicated bearing structures which require frequent maintenance and which are subject to wear or breakage.

The present invention comprises an articulated joint for articulated vehicles which overcomes the foregoing and other problems long since associated with the prior art. In accordance with the broader aspects of the invention, an articulated vehicle comprises forward and rearward units which are interconnected by vertically spaced bearing members. The bearing members define a normally vertical axis of pivotal movement between the forward and rearward units, and structure is provided for selectively pivoting the units about the normally vertical axis to effect steering of the articulated vehicle. One of the bearing members is connected to one of the units by means of an arm, and the arm is connected such that it is capable both of pivoting about an axis normally extending parallel to the normally vertical axis and of oscillating with respect to the two axes. By this means, the articulated joint accommodates oscillation between the vehicles about a longitudinal axis.

In accordance with more specific aspects of the invention, one of the bearing members comprises a spherical bearing, and defines the longitudinal axis. The other bearing member may comprise either a spherical bearing or an elastomeric bearing. The arm is connected to the latter bearing member.

In accordance with other aspects of the invention, one of the units is provided with a cylindrical member which defines the axis of pivotal movement of the arm. The arm has an aperture which receives the cylindrical member. Elastomeric bushings are received in the aperture in the arm and in turn receive the cylindrical member, and function to accommodate both pivotal and oscillatory motion of the arm and to restore the arm to an orientation in which it extends perpendicularly to both axes.

The unit of the articulated vehicle which has the cylindrical member also incorporates structure defining an aperture which receives the arm extending from the cylindrical member. The aperture defining structure is positioned for engagement with the arm upon relative pivotal movement between the units about the longitudinal axis. By this means the extent of relative pivotal movement between the units is limited.

According to still other aspects of the invention, the apparatus for selectively pivoting the units relative to each other about the vertical axis comprises fluid powered cylinders connected between the units. For example, one or more hydraulic cylinders may be utilized to effect steering of the vehicles. The steering cylinders are preferably mounted substantially in the plane of the bearing member which does not have the arm secured thereto. This is to minimize the effect on the steering cylinders of oscillating movement between the units comprising the vehicle about the longitudinal axis.

DESCRIPTION OF THE DRAWINGS

A more complete understanding of the invention may be had by reference to the following detailed description when taken in conjunction with the accompanying drawings, wherein.

DETAILED DESCRIPTION

Figure 1:
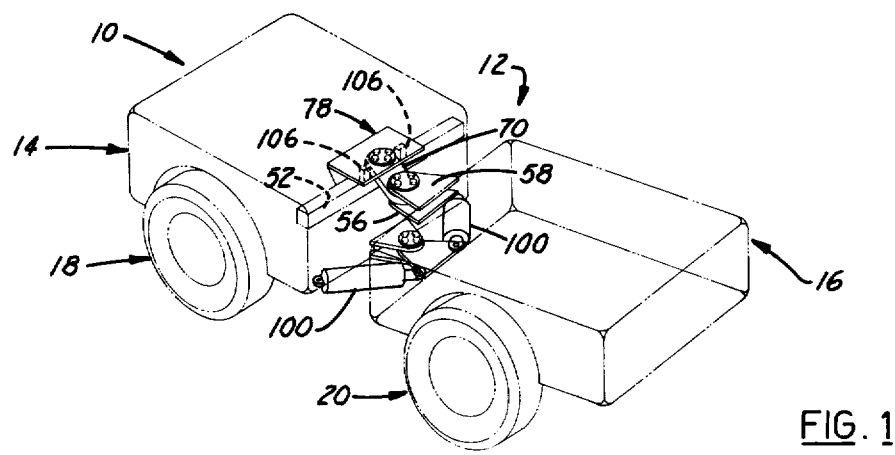
FIG. 1 is an illustration of an articulated vehicle having an articulated joint incorporating the invention.

Referring now to the Drawings, and particularly to FIG. 1 thereof, there is shown an articulated vehicle 10 having an articulated joint 12 incorporating a first embodiment of the present invention. The articulated vehicle 10 comprises a forward portion or unit 14 and a rearward portion or unit 16 which are interconnected by the joint 12. As is usual in articulated vehicles, the forward portion 14 of the vehicle 10 is supported by two or more wheels 18, and the rearward portion 16 is supported by two or more wheels 20.

In actual practice, the vehicle 10 will be equipped with one or more engines (not shown) mounted on the forward portion 14 or the rearward portion 16 or both. The vehicle 10 may have a drive train extending between the portions 14 and 16. The vehicle 10 will also be equipped with an operator's compartment (not shown) including controls for regulating all of the various functions of the vehicle. Finally, either the forward portion 14 or the rearward portion 16 or both may be provided with various operating instrumentalities, such as fixed or movable beds, various hydraulically, electrically or mechanically actuated devices intended to perform specific functions, etc.

Figure 2:
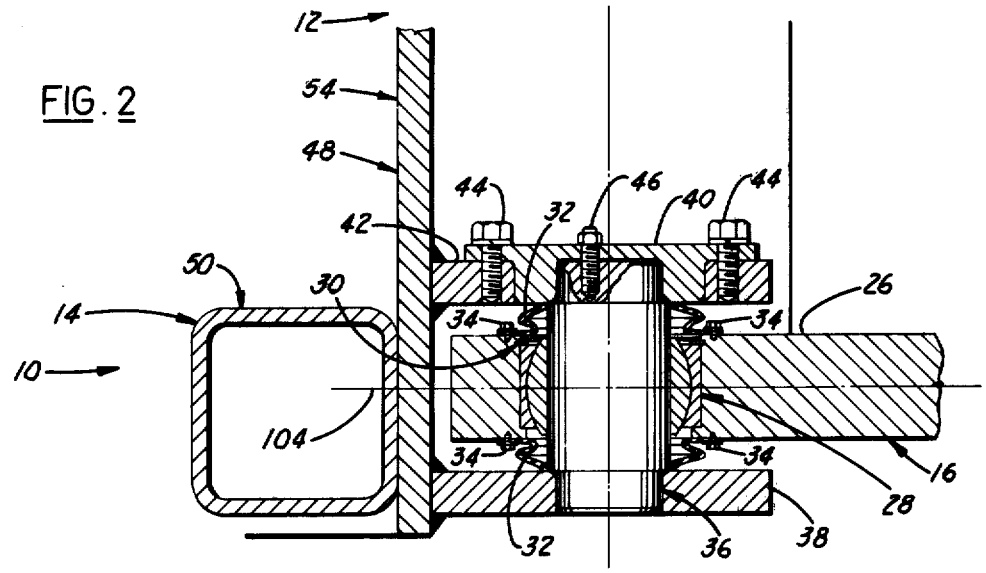
FIG. 2 is a sectional view of an articulated joint constructed in accordance with a first embodiment of the invention.

Referring now to FIG. 2, the articulated joint 12 of the articulated vehicle 10 is shown is greater detail. The rearward portion 16 of the vehicle 10 includes a frame 22 having a bracket 26 extending from the lower end thereof. A conventional spherical bearing 28 is mounted in the bracket 26 and is retained by conventional bearing retaining structures 30. The spherical bearing 28 is provided with conventional seals 32 which are secured to the bracket 26 by fasteners 34.

A rod 36 extends through the spherical bearing 28. The lower end of the rod 36 is received in a bracket 38 extending from the forward portion 14 of the vehicle 10. The upper end of the rod 36 is received in a cap 40 which is secured to a bracket 42 by fasteners 44. The rod 36 is secured to the cap 40 by a fastener 46. The fastener 46 functions to prevent the rod 36 from rotating relative to the cap 40.

The forward portion 14 of the articulated vehicle 10 includes a frame 48 including a pair of rectangular tubular members 50 and 52 and a plate 54 extending therebetween. The rectangular tubular members 50 and 52 and the plate 54 may be interconnected by suitable means, such as welding. The brackets 38 and 42 of the articulated joint 12 are both secured to the plate 54 by suitable means, such as welding, and extend from the plate 54 toward the rearward portion 16 of the articulated vehicle 10.

A pair of brackets 56 and 58 are secured to the frame 22 of the rearward portion 16 of the vehicle 10 by suitable means, such as welding, and extend toward the forward portion 14 of the vehicle 10. A rod 60 is received in the bracket 56 and extends to a cap 62 which is secured to the bracket 58 by fasteners 64. The rod 60 is secured to the cap 62 by a fastener 66 which serves to prevent rotation of the rod 60 relative to the cap 62.

The rod 60 extends through a conventional spherical bearing 68 which is secured in an arm 70 by conventional retaining apparatus 72. The spherical bearing 68 is provided with conventional seals 74 which are secured to the arm 70 by means of fasteners 76. The frame 48 of the forward portion 14 of the articulated vehicle 10 includes a subframe 78. The subframe 78 includes a bracket 80 extending from the rectangular tubular member 52, a plate 82 secured to the rectangular tubular members 52 and to the bracket 80, an end plate 84, and a plate 86. The component parts of the subframe 78 may be secured one to the other by suitable means, such as welding. A rod 88 is received in the plate 82 and extends to a cap 90. The cap 90 is secured to the plate 86 by fasteners 92. Fasteners 94 are utilized to prevent relative rotation between the rod 88 and the cap 90.

The arm 70 is connected to the rod 88 by means of a pair of opposed elastomeric bushings 96. The bushings 96 are received in an aperture 97 formed in the rod and are securely clamped in place by means of the cap 90 and the fasteners 92, whereby the bushings 96 do not rotate either with respect to the rod 88 or with respect to the arm 70. The bushings 96 may also be bonded to the rod 88 and/or to the arm 70, however, in actual practice it has been found that such bonding is not necessary to the successful practice of the invention.

The spherical bearings 28 and 68 and the rods 36 and 60 received therein define a normally vertical axis of relative pivotal movement 98 between the forward portion 14 and the rearward portion 16 of the articulated vehicle 10. Referring again to FIG. 1, hydraulic cylinders 100 are mounted between the forward portion 14 and the rearward portion 16 of the vehicle 10 and are utilized to effect steering of the articulated vehicle 10. That is, the cylinders 100 are utilized to pivot the forward portion 14 and the rearward portion 16 relative to one another about the axis 98, whereby the articulated vehicle 10 is caused to turn to the left, turn to the right, or to move in a straight line.

The rod 88 and the elastomeric bushings 96 define an axis of pivotal movement 102 of the arm 70 relative to the frame 48 of the forward portion 14 of the vehicle 10. The axis 102 normally extends parallel to the axis 98. However, due to the elastomeric nature of the bushings 96, the forward portion 14 and the rearward portion 16 of the vehicle 10 are permitted to pivot relative to one another about a longitudinal axis 104 extending through the lower spherical bearing 28. Upon such relative pivotal movement between the forward portion 14 and the rearward portion 16 of the vehicle 10 about the axis 104, the axes 98 and 102 become non-parallel. However, when the forward and rearward portions 14 and 16 of the vehicle 10 are returned to the normal orientation as illustrated in FIG. 1, the elastomeric nature of the bushings 16 serves to restore the axes 102 and 98 to the parallel relationship illustrated in FIG. 2. Also, the bushings 96 return the arm 70 to an orientation in which it extends substantially longitudinally relative to the frame 48 of the forward portion 14 and substantially perpendicular to the axes 98 and 102.

The frame 48 of the forward portion 14 of the vehicle 10 includes a pair of spaced, parallel members 106 each extending between the plate 54 and the plate 86. The facing surfaces of the members 106, together with the facing surfaces of the plate 86, the plate 54, and the rectangular tubular member 52 define a "window" 108 which receives the arm 70 and which serves to limit relative pivotal movement between the forward portion 14 and the rearward portion 16 of the vehicle 10 about the longitudinal axis 104. Thus, upon contact between the arm 70 and one of the facing surfaces defining the window 108, further relative pivotal movement between the forward portion 14 and the rearward portion 16 of the vehicle 10 is prevented.

Referring again to FIG. 1, the hydraulic cylinders 100 which are utilized to effect steering of the vehicle 10 are preferably mounted in the plane of the lower spherical bearing 28. This is important in the successful practice of the invention, since upon relative pivotal movement between the forward portion 14 and the rearward portion 16 of the vehicle 10 about the axis 104, one of the cylinders 100 tends to be extended and the other cylinder tends to be compressed. Such extension and compression of the steering cylinders is minimized when the cylinders are mounted substantially in the plane of the spherical bearing which is not secured to the arm 70.

Those skilled in the art will appreciate the fact that whereas the present invention has been described in conjunction with an embodiment thereof in which the arm 70 extends from the upper spherical bearings to the forward portion or unit of the articulated vehicle, the invention may be practiced with equal success with the component parts of the articulated joint inverted and/or reversed with respect to the forward and rearward portions or units of the articulated vehicle. The sole important consideration in this regard is that the steering cylinders of the articulated vehicle are mounted substantially in the plane of the spherical bearing which is not connected to the arm of the articulated joint. This is to minimize extension and compression of the steering cylinders upon relative pivotal movement between the two portions or units of the vehicle about the longitudinal axis.

Figure 3:
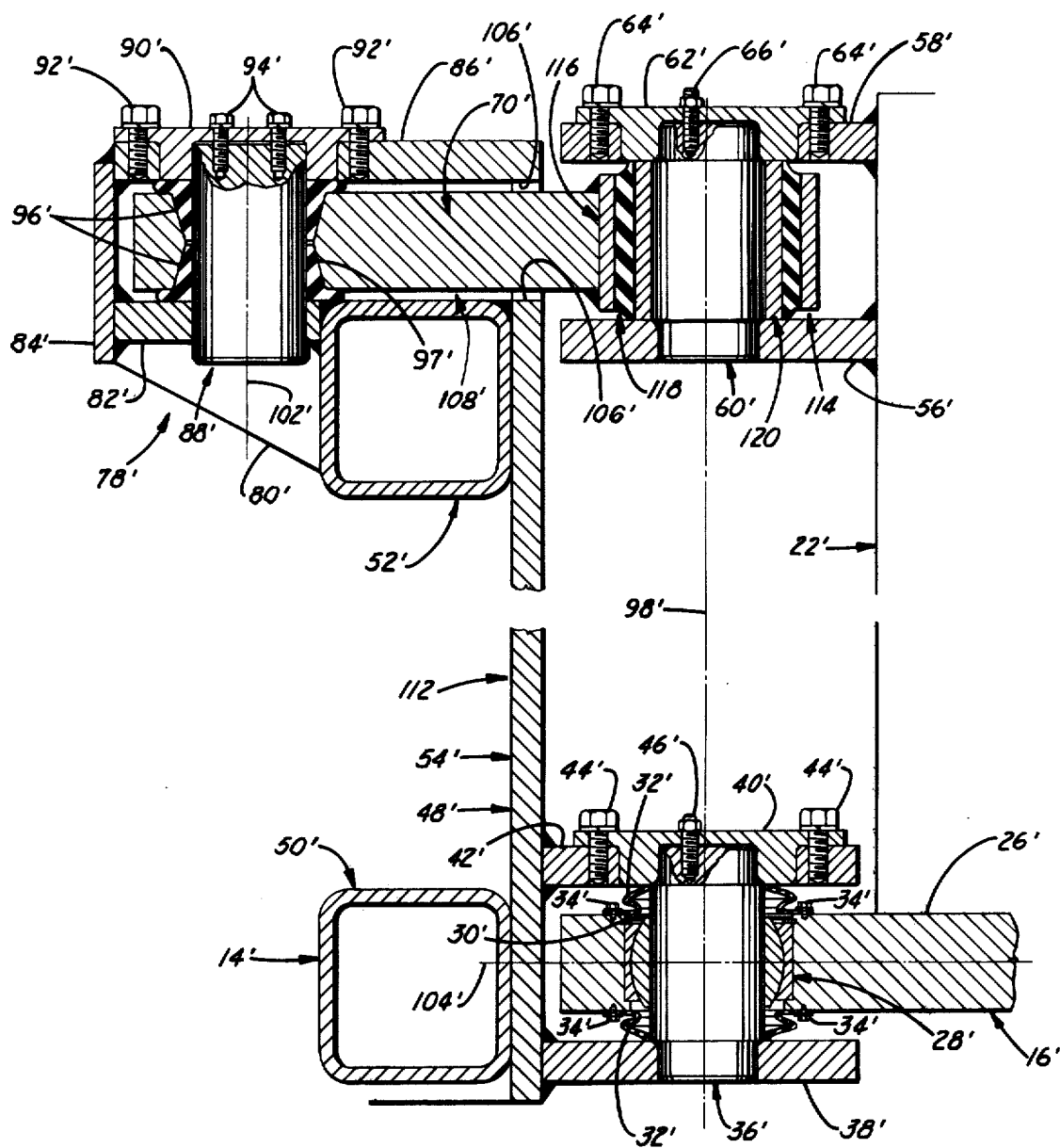
FIG. 3 is a sectional view of an articulated joint constructed in accordance with a second embodiment of the invention.

Referring now to FIG. 3, there is shown an articulated joint 112 incorporating a second embodiment of the invention. The articulated joint 112 contains numerous component parts which are substantially equivalent in construction and function to component parts of the articulated joint 12 as shown in FIG. 2. Such equivalent parts are designated by the same reference numerals in FIGS. 2 and 3, with the component parts of the articulated joint 112 being differentiated from those of the articulated joint 12 by means of a prime (') designation.

The primary distinction between the articulated joint 12 of FIG. 2 and the articulated joint 112 of FIG. 3 involves the connection between the rod 60' and the arm 70' of the articulated joint 112. Such interconnection is by means of an elastomeric bearing 114. The bearing 114 includes an outer sleeve 116 which is secured to the arm 70' by suitable means, such as welding. An elastomeric cylinder 118 is bonded to the interior of the outer sleeve 116, and is in turn bonded to the exterior of an inner sleeve 120. The sleeve 120 is rotatably received on the rod 60'. Conventional techniques may be utilized either to provide the inner sleeve 120 or the rod 60' or both with a low friction surface, or to provide for lubrication between the inner sleeve 120 and the rod 60'.

The rotatable mounting of the inner sleeve 120 of the rod 60' permits relative pivotal movement between the forward and rearward portions or units of an articulated vehicle incorporating the articulated joint 112. Such pivotal movement is necessary to effect steering of the articulated vehicle. Also, the resiliency of the elastomeric cylinder 118 allows the arm 70' to assume an orientation in which it extends angularly both with respect to the axis 102' and with respect to the axis 98'. This allows the forward and rearward portions or units of the articulated vehicle to oscillate relative to one another about the longitudinal axis 104' extending through the spherical bearing 28'. This oscillation is limited by the various members defining the "window" 108' which receives the arm 70'.

It will thus be understood that the articulated joint 112 shown in FIG. 3 functions substantially identically to the articulated joint 12 of FIG. 2. The articulated joint 112 has been illustrated similarly to the articulated joint 12 with the arm 70' extending between the forward unit or portion of the articulated vehicle and the upper bearing defining the vertical axis 98'. It will be understood, however, that the invention may be practiced with equal success with the component parts of the articulated joint 112 inverted and/or reversed with respect to the forward and rearward portions or units of the articulated vehicle.

The articulated joint 112 illustrates the fact that the spherical bearing 68 of the articulated joint 12 may be replaced with the elastomeric bearing 114. Similarly, the elastomeric bushings 96 of the articulated joint 12 may be replaced with a spherical bearing, if desired. On the other hand, it is considered advantageous to utilize a spherical bearing to define the longitudinal axis of relative oscillation between the two portions or units comprising the articulated vehicle. This is to minimize resistance to relative rotation about the two axes defined by this bearing in the articulated joint.

From the foregoing, it will be understood that the present invention comprises a novel articulated joint for articulated vehicles which incorporates numerous advantages over the prior art. Perhaps the most important advantage deriving from the use of the invention involves the fact that by means thereof relative pivotal movement is accommodated between the forward and rearward portions or units of an articulated vehicle without necessitating the use of the complicated articulated joint structure which is characteristic of the prior art. Another advantage in the use of the invention involves the fact that due to the use of elastomeric bushings in an articulated joint, peak stresses due to impact loads are reduced. Still another advantage involves the fact that by means of the present invention there is provided an articulated joint which allows limited relative pivotal movement between the forward and rearward portions of an articulated vehicle about a longitudinal axis, but which restricts excessive relative pivotal movement about the longitudinal axis. A further advantage involves the fact that articulated joints incorporating the present invention are adapted to be manufactured from a small number of easily fabricated parts and are therefore economical to manufacture and use, and yet are adapted for long term, substantially maintenance free service. Other advantages will readily suggest themselves to those skilled in the art.

Although preferred embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

What is claimed is:

1. An articulated joint for interconnecting forward and rearward units to define an articulated vehicle which comprises:
   upper and lower bracket means rigidly mounted on and extending from the adjacent end of one of the units;
   vertically aligned upper and lower bearing members secured to the bracket means to define a normally vertical axis of relative pivotal movement between the units with one of said bearing members comprising a spherical bearing member;
   bracket means rigidly mounted on and extending from the adjacent end of the other unit and secured to the spherical bearing member;
   means connected between the forward and rearward units for selectively pivoting the units relative to each other about the normally vertical axis to effect steering of the articulated vehicle;
   arm means secured to the other bearing member and extending substantially horizontally therefrom to the other unit; and
   means for connecting the arm means to the other unit with the arm normally oriented substantially horizontally and for accommodating both pivotal movement of the arm means about an axis spaced apart from and normally extending substantially parallel to the normally vertical axis defined by the upper and lower bearing members and oscillation of the arm means relative to the two axes and thereby permitting oscillation between the units about a longitudinal axis extending through the spherical bearing member.

2. The articulated joint according to claim 1 further characterized by:
   means mounted on said other unit to define an axis of pivotal movement for the arm;
   an aperture in the arm for receiving the axis defining means; and
   resilient bushing means received in the aperture of the arm and in turn receiving the axis defining means.

3. The articulated joint according to claim 1 wherein the means for selectively pivoting the units relative to each other comprises fluid powered cylinder means.

4. In an articulated vehicle of the type comprising forward and rearward units and an articulated joint interconnecting the units, the improvement comprising:
   first upper bracket means and first lower bracket means both rigidly secured to one of the units and extending from the end thereof adjacent to the other unit to vertically aligned points;
   spherical bearing means secured in the first upper bracket means and the first lower bracket means at the vertically aligned points to define a normally vertical axis of relative pivotal movement between the units;
   fluid powered cylinder means connected between the units for selectively pivoting the units relative to each other about the vertical axis and thereby effecting steering of the articulated vehicle;
   second lower bracket means rigidly secured to the other unit and secured to the spherical bearing means of the first lower bracket means;
   an arm secured to the spherical bearing means of the first upper bracket means and extending therefrom to the other unit;
   means coupling the arm to the other unit to permit relative pivotal movement between the units about a longitudinal axis extending through the spherical bearing means secured to the first and second lower bracket means; and
   means mounted for engagement by the arm to limit relative pivotal movement between the forward and rearward units about the longitudinal axis.

5. The improvement according to claim 4 further characterized by:
   means on the other unit defining a substantially vertical axis of pivotal movement of the arm; and
   elastomeric bushing means mounted between the arm and the axis defining means to accommodate at least limited oscillation between the axis defining means and the arm and thereby permitting relative oscillation between the forward and rearward units about the longitudinal axis.

6. The improvement according to claim 5 wherein the pivotal movement limiting means comprises structure on the other unit defining an aperture which receives the arm and which prevents further relative pivotal movement between the units upon engagement by the arm.

7. The improvement according to claim 4 wherein the fluid powered cylinder means are mounted substantially in the plane of the first and second lower bracket means.

8. An articulated joint for interconnecting forward and rearward units to define an articulated vehicle which comprises:
   vertically aligned upper and lower bearing members defining a normally vertical axis of relative pivotal movement between the units;
   means rigidly securing the upper and lower bearing members to one of the units;
   means rigidly securing one of the bearing members to the other unit;
   means mounted substantially in the plane of said one of the bearing members and connected between the forward and rearward units for selectively pivoting the units relative to each other about the normally vertical axis to thereby effect steering of the articulated vehicle;
   an arm secured to the other bearing member and extending substantially horizontally therefrom to the other unit; and
   means connecting the arm to the other unit with the arm normally disposed substantially horizontally and accommodating both pivotal movement of the arm about an axis spaced apart from and normally extending substantially parallel to the normally vertical axis defined by the upper and lower bearing members and oscillation of the arm relative to the two axes and thereby permitting relative oscillation between the units about a longitudinal axis extending through said one of the bearing members.

9. The articulated joint according to claim 8 wherein the means on the other unit for accommodating both pivotal and oscillatory movement of the arm comprises:
   means on the other unit defining an axis of pivotal movement of the arm; and
   elastomeric bushing means mounted between the axis defining means and the arm for accommodating both pivotal and oscillatory movement of the arm and for restoring the arm to an orientation in which it extends substantially perpendicularly to both of the axes.

10. The articulated joint according to claim 9 further characterized by structure mounted on the other unit for engagement by the arm for limiting oscillation between the forward and rearward units about the longitudinal axis.

11. The articulated joint according to claim 10 wherein the means for causing relative pivotal movement between the units about the vertical axis to effect steering of the articulated vehicle comprises fluid powered cylinder means.

12. The articulated joint according to claim 11 wherein the means rigidly securing the bearing members to said one of the units and means rigidly securing one of the bearing members to said other of the units comprises bracket means rigidly secured to the unit and extending from the adjacent ends thereof.

13. In an articulated vehicle of the type including a forward unit, a rearward unit, and an articulated joint interconnecting the forward and rearward units, the improvement comprising:
vertically spaced spherical bearing members interconnecting the units and defining a normally vertical axis of relative pivotal movement therebetween;
fluid powered cylinder means mounted substantially in the plane of one of the spherical bearing members for causing relative pivotal movement between the units about the normally vertical axis to effect steering of the articulated vehicle;
an arm secured to the other spherical bearing member and extending therefrom to one of the units; and
means resiliently connecting the arm to said one of the units to accommodate both pivotal movement of the arm about an axis spaced apart and normally extending substantially parallel to the normally vertical axis of pivotal movement defined by the spherical bearing members and oscillation of the arm with respect to both axes and thereby permitting relative oscillation between the forward and rearward units about a longitudinal axis extending through said one of the spherical bearing members.

14. The improvement according to claim 13 wherein the means resiliently connecting the arm to said one of the units comprises:
a cylindrical member on said one of the units defining the axis of pivotal movement for the arm;
an aperture on the arm for receiving the cylindrical member on said one of the units; and
resilient bushing means received in the aperture on the arm and in turn receiving the cylindrical member on said one of the units for accommodating both pivotal and oscillatory movement of the arm and for restoring the arm to an orientation in which it extends substantially perpendicular to both axes of pivotal movement.

15. The improvement according to claim 14 further characterized by structure on said one of the units for engagement by the arm to limit relative pivotal movement between the units about the longitudinal axis.

16. The improvement according to claim 15 further characterized by brackets rigidly mounted on the other of the units and secured to the spherical bearing members and a bracket secured to the one of the units and secured to said one of the spherical bearing members.

17. In an articulated vehicle of the type comprising forward and rearward units and an articulated joint interconnecting the units, the improvement comprising:
first upper bracket means and first lower bracket means both rigidly secured to one of the units and extending from the end thereof adjacent the other unit to vertically aligned points;
elastomeric bearing means secured in the first upper bracket means and spherical bearing means secured in the first lower bracket means at the vertically aligned points to define a normally vertical axis of relative pivotal movement between the units;
fluid powered cylinder means connected between the units for selectively pivoting the units relative to each other about the vertical axis and thereby effecting steering of the articulated vehicle;
second lower bracket means rigidly secured to the other unit and secured to the spherical bearing means of the first lower bracket means;
an arm secured to the elastomeric bearing means of the first upper bracket means and extending therefrom to the other unit;
means coupling the arm to the other unit to permit relative pivotal movement between the units about a longitudinal axis extending through the spherical bearing means secured to the first and second lower bracket means; and
means mounted for engagement by the arm to limit relative pivotal movement between the forward and rearward units about the longitudinal axis.

18. The improvement according to claim 17 further characterized by:
means on the other unit defining a substantially vertical axis of pivotal movement of the arm; and
elastomeric bushing means mounted between the arm and the axis defining means to accommodate at least limited oscillation between the axis defining means on the arm, and thereby permitting relative oscillation between the forward and rearward units about the axis.

19. The improvement according to claim 17 wherein the pivotal movement limiting means comprises structure on the other unit defining an aperture which receives the arm and which prevents further relative pivotal movement between the units upon engagement by the arm.

20. The improvement according to claim 17 wherein the fluid powered cylinder means are mounted substantially in the plane of the first and second lower bracket means.

* * * * *